(12) United States Patent
Bian et al.

(10) Patent No.: US 6,872,478 B2
(45) Date of Patent: Mar. 29, 2005

(54) MAGNETIC THIN FILM MEDIA WITH A PRE-SEED LAYER OF CRTIAL

(75) Inventors: Xiaoping Bian, San Jose, CA (US); Mary Frances Doerner, Santa Cruz, CA (US); Kai Tang, San Jose, CA (US); Qi-Fan Xiao, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 15 days.

(21) Appl. No.: 10/608,866

(22) Filed: Jun. 26, 2003

(65) Prior Publication Data

US 2004/0265637 A1 Dec. 30, 2004

(51) Int. Cl.[7] ............... G11B 5/66; G11B 5/70; H01J 1/00; B32B 15/00
(52) U.S. Cl. ............... 428/694 TS; 428/900; 428/336; 428/611; 428/667; 427/131
(58) Field of Search ............ 428/694 TS, 900, 428/336, 611, 667; 427/131

(56) References Cited

U.S. PATENT DOCUMENTS

| 4,287,225 | A | | 9/1981 | Kneller |
| 5,490,809 | A | | 2/1996 | Jones et al. |
| 5,789,056 | A | | 8/1998 | Bian et al. |
| 6,567,236 | B1 | | 5/2003 | Doerner et al. |
| 6,572,989 | B2 | | 6/2003 | Bian et al. |
| 6,586,116 | B1 | | 7/2003 | Bian et al. |
| 6,593,009 | B2 | | 7/2003 | Bian et al. |
| 6,599,642 | B2 | | 7/2003 | Bian et al. |
| 6,607,842 | B2 | | 8/2003 | Bian et al. |
| 6,607,848 | B1 | * | 8/2003 | Oka et al. ............... 428/694 TS |
| 6,613,460 | B1 | * | 9/2003 | Abarra et al. .......... 428/697 TS |

OTHER PUBLICATIONS

Machine translation of JP 10–041134.*

* cited by examiner

*Primary Examiner*—Holly Rickman
(74) *Attorney, Agent, or Firm*—G. Marlin Knight

(57) ABSTRACT

The applicants disclose a thin film magnetic media structure with a pre-seed layer of CrTiAl. The CrTiAl pre-seed layer presents an amorphous or nanocrystalline structure. The CrTiAl pre-seed layer improves in-plane c-axis orientation while maintaining a good orientation ratio. The pulse transition width (PW50) is narrowed and the soft error rate is improved. The preferred seed layer is RuAl.

19 Claims, 2 Drawing Sheets

MAGNETIC THIN FILM MEDIA WITH A PRE-SEED LAYER OF CRTIAL

RELATED APPLICATIONS

Commonly assigned U.S. patent application bearing Ser. No. 09/500,710 now U.S. Pat. No. 6,586,116 describes the use of an amorphous or nanocrystalline CrTa or AlTi as a pre-seed layer. Commonly assigned U.S. patent application bearing Ser. No. 09/798,235 now U.S. Pat. No. 6,593,809 and Ser. No. 10/059,780 pending describe the use of amorphous or nanocrystalline CrTi as a pre-seed layer.

FIELD OF THE INVENTION

The invention relates to magnetic thin film media and methods for their fabrication and more particularly to magnetic thin film disks having a pre-seed layer and a seed layer prior to an underlayer.

BACKGROUND OF THE INVENTION

A typical prior art head and disk system 10 is illustrated in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

Reference is made to FIG. 2 to illustrate the thin film layers in a particular embodiment of a magnetic film disk 16. The substrate 26 is glass. An amorphous initial thin film deposited on the substrate will be called a pre-seed layer 31. The seed layer 32 is deposited onto the pre-seed layer. Typically both the pre-seed layer and seed layer are relatively thin layers. Materials proposed for use as seed layers include chromium, titanium, tantalum, Ni3P, MgO, carbon, tungsten, AlN, FeAl, NiAl and RuAl. In U.S. Pat. No. 5,789,056 to Bian, et al., the use of a CrTi seed layer is described. Following the seed layer is typically a chromium or chromium alloy underlayer 33 such as Cr, CrV and CrTi. The ferromagnetic layer 34 in the thin films is based on various alloys of cobalt, nickel and iron. For example, a commonly used alloy is CoPtCr. Additional elements such as tantalum and boron are often used in the magnetic alloy. A protective overcoat layer is used to improve wearability and corrosion resistance. The disk embodiment described above is one of many possibilities. For example, multiple seed layers, multiple underlayers and multiple magnetic layers have all been proposed in the prior art.

The preferred orientation (PO) of the various crystalline materials forming the layers on the disk, as discussed herein, is not necessarily an exclusive orientation which may be found in the material, but is merely the most prominent orientation. When the Cr underlayer is sputter deposited at a sufficiently elevated temperature on a NiP-coated AlMg substrate a [200] PO is usually formed. This PO promotes the epitaxial growth of [11-20] PO of the hexagonal close-packed (hcp) cobalt (Co) alloy, and thereby improves the magnetic performance of the disk. The [11-20] PO refers to a film of hexagonal structure whose (11-20) planes are predominantly parallel to the surface of the film. Likewise the [10-10] PO refers to a film of hexagonal structure whose (10-10) planes are predominantly parallel to the surface of the film. The [10-10] PO can be epitaxially grown on an appropriate underlayer with a PO of [112].

One technique used in the prior art to improve magnetic recording performance on thin film disks is circumferential polishing to create a pattern of fine "scratches" (circumferential texture) which are generally oriented along tracks (concentric circles) on the disk surface. The scale of the texture of commercial thin film disks is microscopic with a peak-to-valley of less than 5 nm typically. A 5 nm texture appears mirror-like to the untrained eye. Special polishing equipment is necessary to achieve circumferential texture this fine such as is described in Jones, et al., U.S. Pat. No. 5,490,809. The topography of the surface on which a thin film is deposited can have a significant effect on the way the film nucleates and grows and also upon its characteristics. So called circumferential texture on magnetic disks has been commonly used to influence the inplane magnetic anisotropy for a wide range of magnetic alloys. For longitudinal recording it is sometimes useful to have a higher coercivity (Hc) in the circumferential direction than in the radial direction. The ratio of the circumferential Hc to the radial Hc is called the orientation ratio (OR). For example, Kneller U.S. Pat. No. 4,287,225 states that he was able to obtain uniaxial magnetic anisotropy (i.e. OR>1) using circumferential texture with an amorphous SmCo alloy. Others have shown similar effects with body-centered cubic (bcc) alloys. Current disks typically use hexagonal close packed (hcp) cobalt alloys and most (but not all) circumferentially textured disks have an OR>1.

U.S. Pat. No. 6,567,236 to Doerner, et al., describes a preferred embodiment of a layer structure as: a pre-seed layer preferably of CrTi, a seed layer preferably of RuAl, an underlayer preferably of CrTi, a bottom ferromagnetic layer preferably of CoCr, an antiferromagnetic coupling/spacer layer preferably of Ru; and a top ferromagnetic structure including: a thin first sublayer of material preferably of CoCr, CoCrB or CoPtCrB, and a thicker second sublayer of material preferably of CoPtCrB with a lower moment than the first sublayer.

SUMMARY OF THE INVENTION

The applicants disclose a thin film magnetic media structure with a pre-seed layer of CrTiAl. The CrTiAl pre-seed layer presents an amorphous or nanocrystalline structure. The CrTiAl pre-seed layer improves in-plane c-axis orientation while maintaining a good orientation ratio. The pulse transition width (PW50) is narrowed and the soft error rate is improved. The preferred seed layer is RuAl.

DETAILED DESCRIPTION OF THE INVENTION AND THE PREFERRED EMBODIMENTS

For longitudinal media on glass or other nonmetallic substrates, it is important to maximize the c-axis in-plane crystallographic orientation and maintain the orientation ratio. Some pre-seed layer materials contribute to good in-plane c-axis orientation when used on smooth or randomly polished substrates, but turn out not to be satisfactory for used on circumferential textured substrates because they produce a much lower orientation ratio (OR). The pre-seed layer described herein is an amorphous or nanocrystalline layer of CrTiAl alloy that is particularly suited to use on circumferential textured substrates since it helps achieve a good in-plane c-axis orientation, as well as, a high orientation ratio. The combination of these properties leads to a narrower transition pulse width (PW50) and improved soft error rate (SER).

Figure 1:
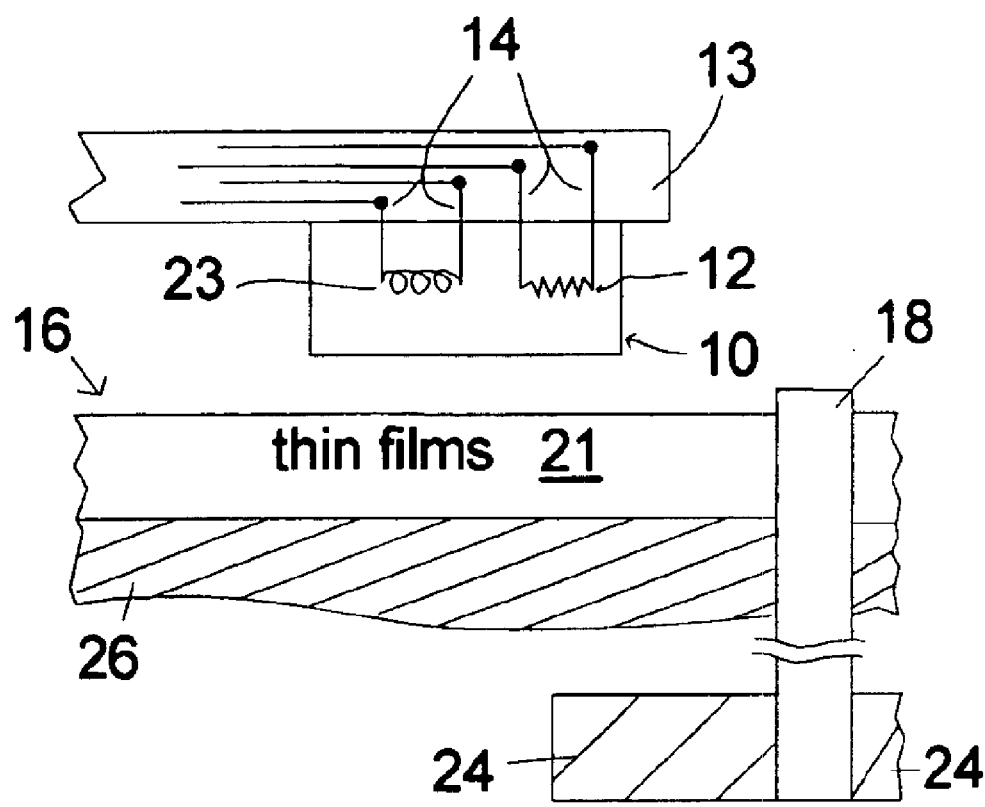
FIG. 1 is a symbolic illustration of the prior art showing the relationships between the head and associated components in a disk drive.
Figure 2:
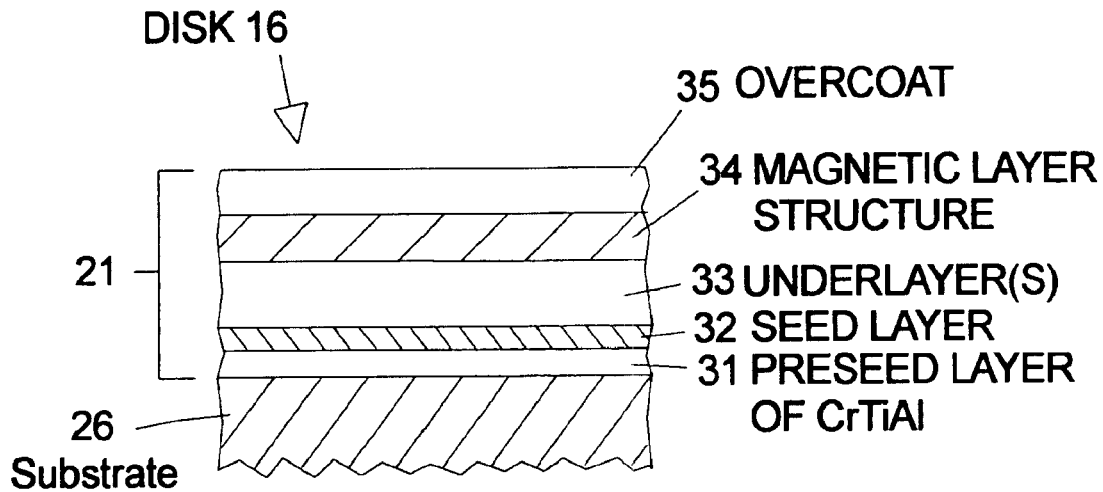
FIG. 2 is an illustration of a layer structure for a magnetic thin film disk in which the pre-seed layer of the invention can be used.
Figure 3:
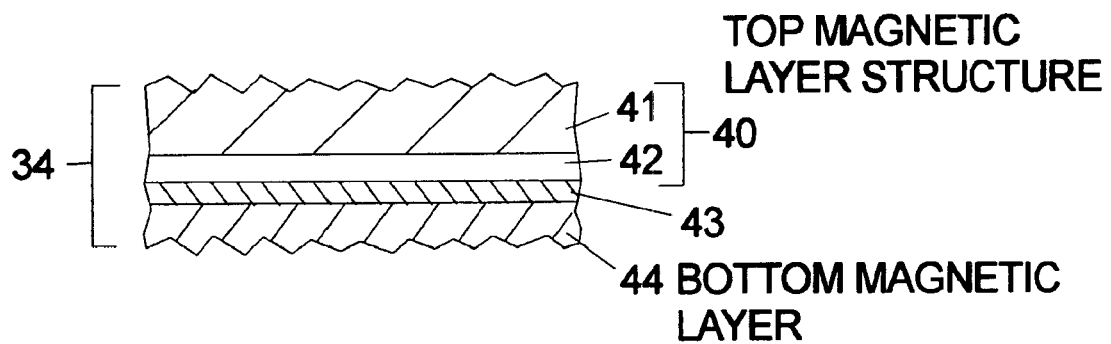
FIG. 3 is an illustration of a magnetic layer stack including a bilayer upper ferromagnetic layer structure for a magnetic thin film disk according to the invention.

Reference is made to FIGS. 2 and 3 to illustrate the thin film layers in a magnetic film disks 16 embodying the invention. In the embodiments shown in FIGS. 2 and 3 the CrTiAl layer 31 is sputter deposited directly onto the substrate surface 26 which may be glass or any other appropriate material or surface. The CrTiAl pre-seed layer of the invention may be used with a variety of seed layers. The CrTiAl pre-seed layer with the preferred seed layer RuAl may also be referred to as a CrTiAl/RuAl bi-layer structure. The CrTiAl layer allows the following RuAl layer 32 to be kept very thin, thus saving on the high cost of RuAl. The chromium based underlayer 33 may also be kept very thin when CrTiAl is used.

It is known that the cobalt alloy magnetic films may be grown with the in-plane preferred orientations of (11-20) by first depositing an underlayer with a (200) preferred orientations respectively. A RuAl seed layer with a B2 crystallographic structure is used to obtain an underlayer with a preferred in-plane orientation of (200) and a cobalt alloy magnetic film with the preferred in-plane orientation of (11-20). The (11-20) PO is important for achieving an orientation ratio greater than one.

FIGS. 2 and 3 illustrate the layer structure 21 of a preferred embodiment of the invention in thin film magnetic disk 16. The films include a magnetic layer structure 34 which has antiferromagnetically coupled magnetic layers according to U.S. Pat. No. 6,567,236 to Doerner, et al. The CrTiAl pre-seed layer 31 is the first thin film on the substrate 26. The substrate 26 can be any prior art substrate material with glass being preferred. The applicants' most preferred structure includes a seed layer 32 of RuAl (B2 crystal structure) and a $CrTi_{20}$ underlayer 33.

The magnetic layer stack 34 is composed of a plurality of layers which are further illustrated in FIG. 3. The preferred magnetic layer stack 34 has at least four distinct layers. The bottom magnetic layer 44 is a ferromagnetic material of the type used in the prior art of thin film disks. Examples of materials suitable for bottom magnetic layer 44 include CoCr, CoPtCr and CoPtCrB with CoCr being preferred by the applicants with 10 to 14 at. % chromium. The thickness of the bottom magnetic layer 44 must be chosen in relation to the thickness of the top magnetic layer structure 40 as indicated above, but 10–30 Angstroms is a preferred range. The coupling/spacer layer 43 is a nonmagnetic material with a thickness that is selected to antiferromagnetically couple the top magnetic layer structure 40 with the bottom magnetic layer 44. Ruthenium is the preferred material for the coupling/spacer layer 43, but the prior art indicates that suitable materials include chromium (Cr), rhodium (Rh), iridium (Ir), copper (Cu), and their alloys. The thickness of the exchange/spacer layer 43 is according to the prior art; for example, approximately 6 Angstroms is a preferred target thickness for a ruthenium coupling/spacer layer 43. The top magnetic layer structure 40 is preferably a bilayer structure including two distinct ferromagnetic materials. The interface (first) sublayer 42 is a thin layer of material with a relatively high moment, that is, a moment higher than the second sublayer. The preferred materials for the interface sublayer 42 are CoCr, CoCrB and CoPtCrB. The preferred thickness is approximately 3–15 Angstroms. The interface sublayer material is selected to have a higher magnetic moment than the second sublayer. As is known in the art, the moment of the cobalt alloys is decreased in varying degrees by the amounts of the alloying elements, e.g., platinum, chromium and boron, that are included. Therefore, even though the first and second sublayers may contain the same elements, the atomic percentages will be different to achieve the goal of a higher moment in the first sublayer.

The second sublayer has a lower magnetic moment and is also much thicker than the first sublayer with a composition and thickness selected to provide the Mrt when combined with first sublayer that is needed for the overall magnetic structure. The top ferromagnetic layer structure, which includes the first and second sublayer, is designed to have a greater Mrt than the bottom ferromagnetic layer, so that the net moment in zero applied magnetic field is low, but nonzero.

The preferred thickness for the CrTiAl pre-seed layer is from 10 nm to 30 nm. The preferred compositional range is from 5 at. % to 20 at. % aluminum with the remainder being approximately equal atomic percentages of chromium and titanium. The RuAl layer is deposited with a B2 crystallographic structure and is, therefore, substantially 50 at. % aluminum.

In an experiment comparing media with a $Cr_{50}Ti_{50}$ pre-seed layer on a circumferential textured substrate, the $Cr_{44}Ti_{44}Al_{12}$ embodiment of the pre-seed layer of the invention was found to achieve a significantly lower degree of full width, half maximum (FWHM) X-ray diffraction for the (11-20) cobalt peak. The achievable orientation ratio was the same for both films. This shows that CrTiAl pre-seed layer produced a better c-axis in-plane orientation for the same OR values.

Table 1 gives the transition pulse width (PW50) and the soft error rate (SER) for disks made with $Cr_{50}Ti_{50}$ and $Cr_{44}Ti_{44}Al_{12}$ pre-seed layers. The data show an improved performance in both of these parameters for the $Cr_{44}Ti_{44}Al_{12}$ pre-seed layer.

TABLE 1

| Pre-Seed Layer | PW50 (nm) | log (SER) |
| --- | --- | --- |
| $CrTi_{50}$ | 118.6 | −4.7 |
| $Cr_{44}Ti_{44}Al_{12}$ | 117.5 | −5.1 |

The atomic percent compositions given above are given without regard for the small amounts of contamination that invariably exist in sputtered thin films as is well known to those skilled in the art. The invention has been described with respect to particular embodiments, but other uses and applications for the pre-seed layer of the invention will be apparent to those skilled in the art.

What is claimed is:

1. A thin film layer structure for use in magnetic recording comprising:

a pre-seed layer of CrTiAl having an amorphous structure;

at least one seed layer above the pre-seed layer;

at least one underlayer above the seed layer; and at least one magnetic layer above the underlayer.

2. The thin film structure of claim 1 wherein the seed layer is RuAl having a B2 crystallographic structure.

3. The thin film layer structure of claim 1 wherein the pre-seed layer of CrTiAl is approximately 5 to 20 at. % aluminum.

4. The thin film layer structure of claim 1 wherein the pre-seed layer of CrTiAl is deposited on a circumferential textured nonmetallic substrate.

5. A magnetic thin film storage medium comprising:

a substrate;

a layer of CrTiAl deposited on the substrate, the CrTiAl having an amorphous or nanocrystalline structure;

a layer of RuAl over the layer of CrTiAl; and at least one underlayer over the layer of RuAl at least one magnetic layer over the underlayer.

6. The magnetic thin film storage medium of claim 5 wherein the CrTiAl has from 5 to 20 at. % aluminum.

7. The magnetic thin film storage medium of claim 5 wherein the CrTiAl has approximately from 5 to 20 at. % aluminum with the remainder being approximately equal atomic percentages of chromium and titanium.

8. The magnetic thin film storage medium of claim 5 wherein the RuAl has a B2 crystallographic structure.

9. The magnetic thin film storage medium of claim 5 wherein the CrTiAl is approximately from 10 to 30 nm thick.

10. A method of fabricating a magnetic thin film storage medium comprising the steps of:

depositing a layer of CrTiAl on a substrate, the CrTiAl having an amorphous or nanocrystalline structure;

depositing a layer of RuAl over the layer of CrTiAl; and depositing a plurality of layers over the layer of RuAl, including at least one magnetic layer.

11. The method of claim 10 wherein the CrTiAl has from 5 to 20 at. % aluminum.

12. The method of claim 10 wherein the CrTiAl has approximately from 5 to 20 at. % aluminum with the remainder being approximately equal atomic percentages of chromium and titanium.

13. The method of claim 10 wherein the RuAl has a B2 crystallographic structure.

14. The method of claim 10 wherein the CrTiAl is from approximately from 10 to 30 nm thick.

15. A disk drive comprising:

a magnetic transducer including a read and a write head;

a spindle; and a magnetic thin film disk mounted on the spindle, the magnetic thin film disk including a layer of CrTiAl followed by a layer of RuAl and at least one magnetic layer, the CrTiAl having an amorphous or nanocrystalline structure.

16. The disk drive of claim 15 wherein the CrTiAl has from 5 to 20 at. % aluminum.

17. The disk drive of claim 15 wherein the CrTiAl has approximately from 5 to 20 at. % aluminum with the remainder being approximately equal atomic percentages of chromium and titanium.

18. The disk drive of claim 15 wherein the RuAl has a B2 crystallographic structure.

19. The disk drive of claim 15 wherein the CrTiAl is approximately from 10 to 30 nm thick.

* * * * *